US012631442B2

(12) United States Patent　　　(10) Patent No.:　US 12,631,442 B2

Golani et al.　　　(45) Date of Patent:　　May 19, 2026

(54) DEPTH PROFILING OF SEMICONDUCTOR STRUCTURES USING MULTI-WAVELENGTH PUMP-PROBE TECHNIQUE

(71) Applicant: Applied Materials Israel Ltd., Rehovot (IL)

(72) Inventors: Ori Golani, Kibbutz Shoval (IL); Ido Almog, Rehovot (IL); Yariv Simovitch, Rehovot (IL); Guy Shwartz, Ramat-Gan (IL)

(73) Assignee: Applied Materials Israel Ltd., Rehovot (IL)

( * ) Notice: Subject to any disclaimer, the term of this patent is extended or adjusted under 35 U.S.C. 154(b) by 373 days.

(21) Appl. No.: 18/508,028

(22) Filed: Nov. 13, 2023

(65) Prior Publication Data

US 2025/0155235 A1　　May 15, 2025

(51) Int. Cl.
G01B 11/22　　(2006.01)
G01N 29/04　　(2006.01)
G01N 29/07　　(2006.01)
G01N 29/24　　(2006.01)

(52) U.S. Cl.
CPC ........... G01B 11/22 (2013.01); G01N 29/043 (2013.01); G01N 29/07 (2013.01); G01N 29/2418 (2013.01); *G01B 2210/56* (2013.01); *G01N 2291/2697* (2013.01)

(58) Field of Classification Search
CPC .. G01B 11/22; G01B 2210/56; G01N 29/043; G01N 29/07; G01N 29/2418; G01N 2291/2697

See application file for complete search history.

(56) References Cited

U.S. PATENT DOCUMENTS

| | | | |
|---|---|---|---|
| 6,002,480 | A | 12/1999 | Izatt et al. |
| 7,050,178 | B2 | 5/2006 | Morath et al. |
| 7,528,940 | B2 | 5/2009 | Veis et al. |
| 8,312,772 | B2 | 11/2012 | Tas et al. |
| 9,050,178 | B2 | 6/2015 | Barry et al. |
| 9,268,092 | B1 | 2/2016 | Jarecki et al. |
| 9,576,862 | B2 | 2/2017 | Murray et al. |

(Continued)

FOREIGN PATENT DOCUMENTS

WO　　　2020247473 A1　　12/2020

OTHER PUBLICATIONS

Gusev, et al., "Advances in Applications of Time-domain Brillouin Scattering for Nanoscale Imaging", Applied Physics Reviews, American Institute of Physics, 2 Huntington Quadrangle, Melville, NY, 11747, vol. 5, No. 3, Jul. 12, 2018, pp. 1-55.

(Continued)

*Primary Examiner* — Jamil Ahmed
(74) *Attorney, Agent, or Firm* — Kilpatrick Townsend & Stockton LLP

(57)　　　　　ABSTRACT

A systems for in-depth profiling of patterned wafer samples including a pump pulse and plurality of probe pulses each having a different wavelength ($\lambda_1$-$\lambda_n$), and an optical setup configured to combine the plurality of probe pulses, such that they simultaneously reach the same target region of the sample and to separate the plurality of probe pulses upon their reflection from the sample, such that each of the plurality of probe pulses is detected by a separate detector.

20 Claims, 9 Drawing Sheets

(56) References Cited

U.S. PATENT DOCUMENTS

| | | | |
|---|---|---|---|
| 10,088,418 B2 | 10/2018 | Cheshnovsky et al. | |
| 10,371,668 B2 | 8/2019 | Garnett et al. | |
| 11,195,267 B1 | 12/2021 | Ilan et al. | |
| 2015/0003834 A1 | 1/2015 | Shan et al. | |
| 2016/0109736 A1 | 4/2016 | Bahl et al. | |
| 2017/0254749 A1 | 9/2017 | Yun | |
| 2019/0242820 A1 | 8/2019 | Audoin et al. | |
| 2019/0335994 A1 | 11/2019 | Yun et al. | |
| 2021/0098222 A1 | 4/2021 | Garcia Berrios et al. | |
| 2021/0109453 A1 | 4/2021 | Pandev | |
| 2022/0113129 A1* | 4/2022 | Golani | G01B 11/22 |
| 2023/0326713 A1 | 10/2023 | Shwartz et al. | |

OTHER PUBLICATIONS

Matsuda, et al., "Coherent Shear Phonon Generation and Detection with Picosecond Laser Acoustics", Physical Review B, vol. 77, Jun. 20, 2008, 224110-1-224110-16.

Matsuda, et al., "Fundamentals of Picosecond Laser Ultrasonics", Ultrasonics, vol. 56, Feb. 2015, pp. 1-18.

U.S. Appl. No. 17/714,908, "Notice of Allowance", Jan. 7, 2025, 8 pages.

\* cited by examiner

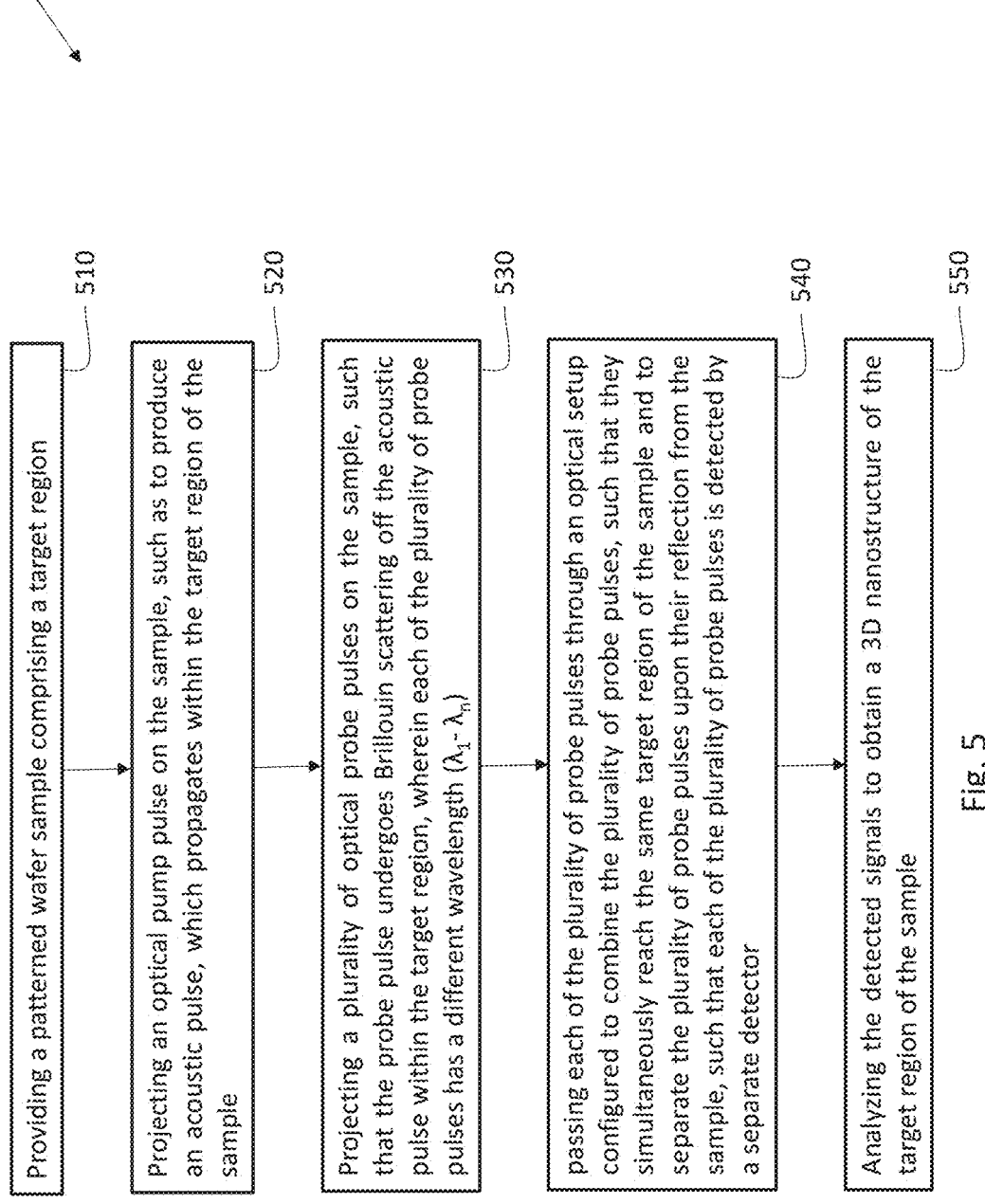

510 Providing a patterned wafer sample comprising a target region

520 Projecting an optical pump pulse on the sample, such as to produce an acoustic pulse, which propagates within the target region of the sample 530 Projecting a plurality of optical probe pulses on the sample, such that the probe pulse undergoes Brillouin scattering off the acoustic pulse within the target region, wherein each of the plurality of probe pulses has a different wavelength $(\lambda_1 - \lambda_n)$ 540 passing each of the plurality of probe pulses through an optical setup configured to combine the plurality of probe pulses, such that they simultaneously reach the same target region of the sample and to separate the plurality of probe pulses upon their reflection from the sample, such that each of the plurality of probe pulses is detected by a separate detector 550 Analyzing the detected signals to obtain a 3D nanostructure of the target region of the sample

Fig. 5

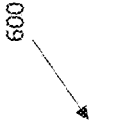

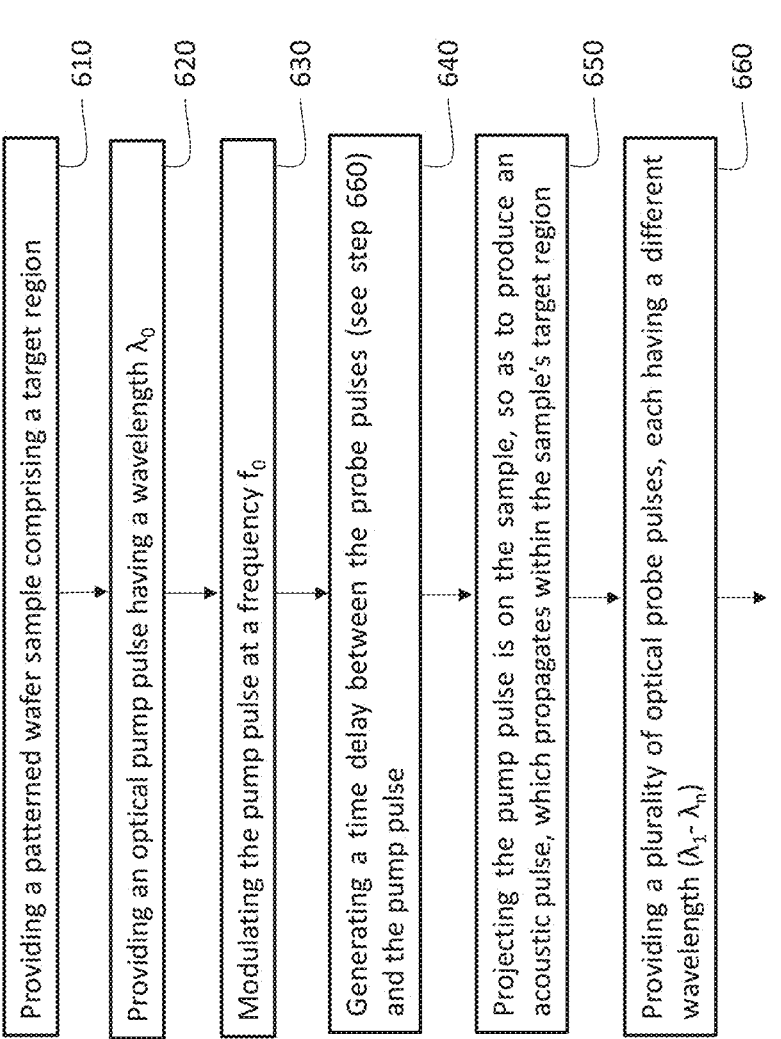

600

610 Providing a patterned wafer sample comprising a target region

620 Providing an optical pump pulse having a wavelength $\lambda_0$

630 Modulating the pump pulse at a frequency $f_0$

640 Generating a time delay between the probe pulses (see step 660) and the pump pulse 650 Projecting the pump pulse is on the sample, so as to produce an acoustic pulse, which propagates within the sample's target region 660 Providing a plurality of optical probe pulses, each having a different wavelength ($\lambda_1 - \lambda_n$)

Fig. 6

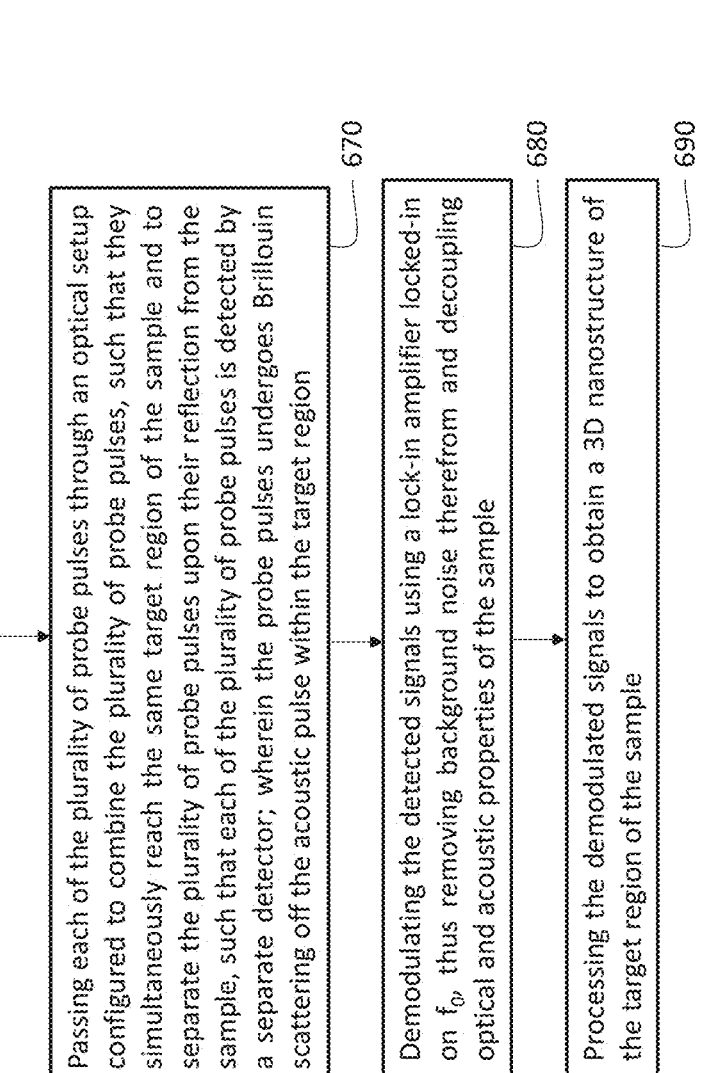

600

670

Passing each of the plurality of probe pulses through an optical setup configured to combine the plurality of probe pulses, such that they simultaneously reach the same target region of the sample and to separate the plurality of probe pulses upon their reflection from the sample, such that each of the plurality of probe pulses is detected by a separate detector; wherein the probe pulses undergoes Brillouin scattering off the acoustic pulse within the target region

680

Demodulating the detected signals using a lock-in amplifier locked-in on $f_0$, thus removing background noise therefrom and decoupling optical and acoustic properties of the sample

690

Processing the demodulated signals to obtain a 3D nanostructure of the target region of the sample

Fig. 6 (Cont.)

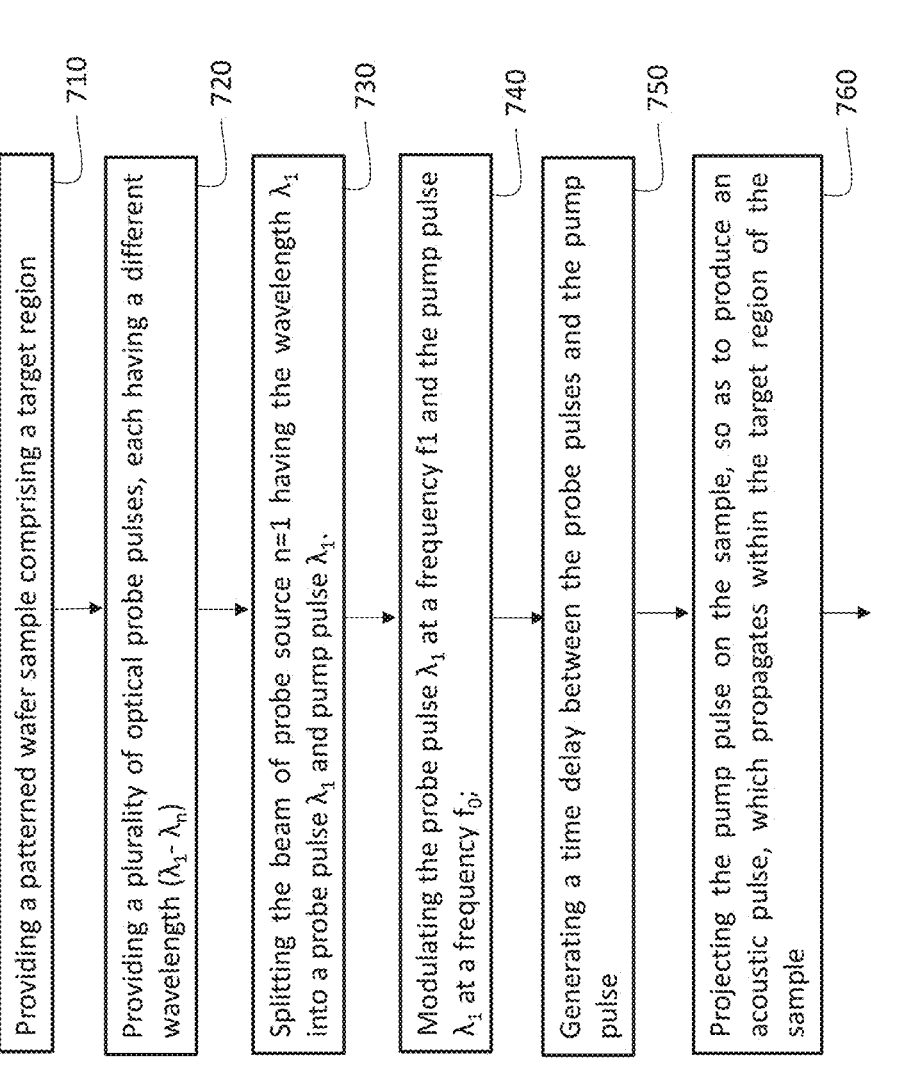

700

710 — Providing a patterned wafer sample comprising a target region

720 — Providing a plurality of optical probe pulses, each having a different wavelength $(\lambda_1 - \lambda_n)$ 730 — Splitting the beam of probe source n=1 having the wavelength $\lambda_1$ into a probe pulse $\lambda_1$ and pump pulse $\lambda_1$.

740 — Modulating the probe pulse $\lambda_1$ at a frequency f1 and the pump pulse $\lambda_1$ at a frequency $f_0$;

750 — Generating a time delay between the probe pulses and the pump pulse

760 — Projecting the pump pulse on the sample, so as to produce an acoustic pulse, which propagates within the target region of the sample

Fig. 7

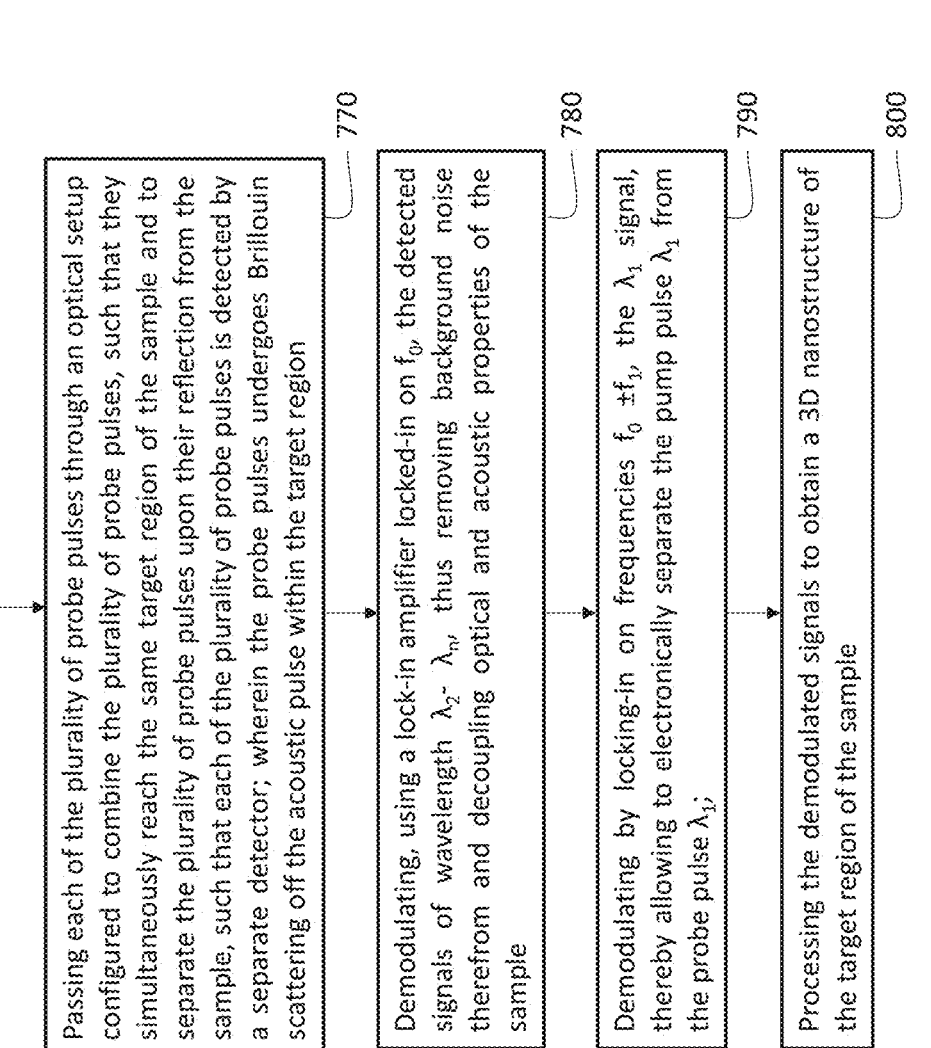

700

770

Passing each of the plurality of probe pulses through an optical setup configured to combine the plurality of probe pulses, such that they simultaneously reach the same target region of the sample and to separate the plurality of probe pulses upon their reflection from the sample, such that each of the plurality of probe pulses is detected by a separate detector; wherein the probe pulses undergoes Brillouin scattering off the acoustic pulse within the target region

780

Demodulating, using a lock-in amplifier locked-in on $f_0$ the detected signals of wavelength $\lambda_2$- $\lambda_n$, thus removing background noise therefrom and decoupling optical and acoustic properties of the sample

790

Demodulating by locking-in on frequencies $f_0$ $\pm f_1$, the $\lambda_1$ signal, thereby allowing to electronically separate the pump pulse $\lambda_1$ from the probe pulse $\lambda_1$;

800

Processing the demodulated signals to obtain a 3D nanostructure of the target region of the sample

Fig. 7 (Cont.)

DEPTH PROFILING OF SEMICONDUCTOR STRUCTURES USING MULTI-WAVELENGTH PUMP-PROBE TECHNIQUE

TECHNICAL FIELD

The present disclosure relates generally to depth-profiling of samples.

BACKGROUND OF THE INVENTION

Pump probe technique (also referred to as "picosecond laser ultrasonics" and "laser picosecond acoustics") is a non-destructive technique which may be used for obtaining structural information from thin films and nanostructures. In a typical scenario, an ultrashort light pulse (usually referred to as a "pump pulse") may be projected and partially absorbed on an external or internal surface of a structure. A thin tranche of the structure, adjacent to and including the absorbing surface, is heated by absorbing the light pulse. Due to the heating thereof, the tranche expands, leading to the formation of an acoustic pulse (also referred to as an "elastic strain pulse" or "strain pulse"), which travels into the depth of the structure and away from the external surface. On reaching a boundary surface, such as the opposite side of a thin film or a second layer of a multi-layered structure, at least part of the acoustic pulse is reflected and propagates back towards the external surface. A probe signal is projected on the structure such as to be incident thereon when the acoustic pulse arrives thereat. The probe signal reflected off the structure and the intensity of the reflected component of the probe signal is monitored. From the monitored intensity of the reflected component, one-dimensional structural information regarding the probed structure can be extracted. For example, film thickness or thicknesses of layers (when the structure is multi-layered) can be extracted.

However, while pump-probe measurements of a sample can provide depth information with very high resolution (20 nm-300 nm), effective 3D profiling of nanostructures using the standard method is limited due to an inherent coupling between the optical (refractive index) and acoustic (speed of sound) properties of the structure.

There therefore remains a need for systems and methods enabling in-depth profiling of 3D nanostructures, while essentially decoupling optical and acoustic properties of the sample.

BRIEF SUMMARY OF THE INVENTION

According to some embodiments, there is provided an optical system and method for in-depth profiling of 3D nanostructures of wafer samples, which uses several probe pulses, each with a different wavelength. This allows to de-couple between optical and acoustic properties of the sample. The invention relates both to the optical arrangement of the system and the use of the detected signals to estimate the structure's properties.

Particularly, the system and method allow extracting structural information from regions deep below the wafer surface, which is very difficult to do using other methods (such as SEM).

The method is based on optical pump-probe configurations, also known as picosecond ultrasonics, as essentially described in Golani et al., U.S. Publication No. 20220113129, incorporated herein by reference.

However, several new features are advantageously added:

1. An optical setup which allows to use multiple probe pulses, each with a different wavelength.
2. Using the multiple detected signals of each wavelength to separate between optical and acoustical properties of the sample.

Advantageously, this setup allows to break the coupling between acoustic and optical properties. This is because the acoustic properties are common for all probes, whereas the optical properties vary. Joint processing of the signals from each wavelength allows to better estimate the properties of the structure.

According to some embodiments, there is provided a pump-probe based system for in-depth profiling of a patterned wafer sample, the system comprising: n probe sources each of the n probe sources configured to simultaneously emit light pulses at a different wavelength $(\lambda_1-\lambda_n)$, a pump source configured to transmit pump pulse at a wavelength $\lambda_0$; n detectors each configured to detect a different one of wavelengths $\lambda_1-\lambda_n$; a pump modulator configured to modulate the pump pulse having the wavelength $\lambda_0$ at a frequency $f_0$; a time delay configuration for generating a time delay between the pump pulse and the probe pulses; a lock-in amplifier and an optical setup.

According to some embodiments, the optical setup is configured to: direct the modulated pump pulse on the target region of the sample, thereby producing an acoustic pulse propagating within the target region, direct the probe pulses to simultaneously impinge on the target region of the sample at the time delay relative to the pump pulse; and to separate the light reflected from the sample, so that each of the $\lambda_1-\lambda_n$ wavelengths of the reflected probe pulses are detected as separate signals by a respective of the n detectors;

According to some embodiments, the lock-in amplifier is configured to demodulate the $\lambda_1-\lambda_n$ signals detected by the respective n detectors by locking in on $f_0$, thereby enabling detection of the acoustic effect generated by the pump pulse, while removing background optical signal.

According to some embodiments, the system further comprises a processor configured to receive the demodulated signals and to determine a 3D nanostructure of the target region of the sample based thereon.

According to some embodiments, the optical setup comprises: n dichroic mirrors each having a cut-on wavelength $\lambda_m<\lambda_{cut-on}<\lambda_{m+1}$, wherein the $\lambda_m$ of each of the dichroic mirrors represents a different wavelength of the $\lambda_1-\lambda_n$ wavelengths; and n optical elements (BS) each optically coupled to a respective detector of the n detectors and to an associated dichroic mirror of the n dichroic mirrors, wherein each of the n optical elements (BS) is configured to direct light reflected from the sample, through the respective dichroic mirror, to the respective detector. According to some embodiments, the optical setup further comprises n–1 deflecting optical elements (M) optically associated with the n dichroic mirrors, wherein each of the n–1 deflecting optical elements (M) is configured to receive light reflected from or transmitted through a dichroic mirror positioned optically before the deflecting optical element (M) and deflect it onto a dichroic mirror positioned optically after the deflecting optical element (M); and to receive light reflected from the dichroic mirror positioned optically after the deflecting optical element (M) and deflect it onto the dichroic mirror positioned optically before the deflecting optical element (M).

According to some embodiments, the n optical elements (BS) are beam splitters.

According to some embodiments, the n dichroic mirrors are long-pass dichroic mirrors, short-pass dichroic mirrors or band-pass mirrors. Each possibility is a separate embodiment.

According to some embodiments, the n−1 deflective optical elements (M) are selected from mirrors, right-angled prisms, diffracting optical element or any combination thereof. Each possibility is a separate embodiment.

According to some embodiments, all of the some of the n−1 deflective optical elements (M) are of a same type (e.g., mirrors). According to some embodiments, some of the n−1 deflective optical elements (M) are of one type and other of another type (e.g., some mirrors and some right-angled prisms).

According to embodiments, the optical setup comprises a chromatic splitter configured to combine the $\lambda_1$-$\lambda_n$ wavelengths prior to reaching the sample and to separate the $\lambda_1$-$\lambda_n$ wavelengths reflected from the sample prior to reaching the n detectors. According to embodiments, the optical setup. According to embodiments, the optical setup further comprises n optical elements (BS) each optically coupled to a respective detector of the n detectors, wherein each of the n optical elements (BS) is configured to transmit the n probe pulses therethrough to the chromatic splitter and onto the sample; and to direct light reflected from the sample, through the chromatic splitter, to the respective n detectors. According to embodiments, the optical setup further comprises n deflecting optical elements (M) optically associated with the n optical elements (BS) and with the chromatic splitter, wherein each of the n deflecting optical elements (M) is configured to receive light transmitted through an associated optical element (BS) of the n optical element (BS) and to deflect it onto the sample via the chromatic splitter; and to receive light reflected from the sample, via the chromatic splitter, and deflect it onto the respective detector of the n detectors via the n optical element (BS).

According to embodiments, the lock-in amplifier is a single lock-in amplifier with n entries. According to embodiments, the optical setup comprises n lock-in amplifiers. According to some embodiments, the optical setup comprises more than one but less than n lock-in amplifiers, each lock-in amplifier having more than one but less than n entries.

According to embodiments, the time delay configuration is positioned the pump line optical path. According to embodiments, the time delay configuration comprises n time delay configurations each positioned at a different of the n probe source optical paths.

According to embodiments, the time delay configuration $\lambda_1 < \lambda_2 < \lambda_3 \ldots < \lambda_n$. According to embodiments, the time delay configuration $\lambda_1 > \lambda_2 > \lambda_3 \ldots > \lambda_n$.

According to some embodiments, there is provided a pump-probe based system for depth-profiling of a patterned wafer sample, the system comprising: n probe sources each of the n probe sources configured to simultaneously emit light pulses at a different wavelength ($\lambda_1$-$\lambda_n$), wherein $\lambda_1$ is further used as a pump pulse for producing an acoustic pulse, which propagates within a target region of the sample; n detectors each configured to detect a different one of wavelengths $\lambda_1$-$\lambda_n$; a pump modulator configured to modulate the pump pulse having the wavelength $\lambda_1$ at a frequency $f_0$, a probe modulator configured to modulate the probe pulse $\lambda_1$ at a frequency $f_1$; a time delay configuration for generating a time delay between the pump pulse and the probe pulses; a lock-in amplifier and an optical setup.

According to some embodiments, the optical setup configured to: direct the $f_0$ modulated pump pulse on the target region of the sample to thereby produce an acoustic pulse propagating within the target region, and direct the probe pulses to simultaneously impinge on the target region of the sample at the time delay relative to the pump pulse; and to separate the light reflected from the sample, so that each of the $\lambda_1$-$\lambda_n$ wavelengths of the reflected probe pulses are detected as separate signals by a respective of the n detectors.

According to some embodiments, the lock-in amplifier configured to demodulate the $\lambda_2$-$\lambda_n$ signals detected by the respective n detectors by locking in on $f_0$, thereby enabling detection of the acoustic effect generated by the pump pulse, while removing background optical signal. According to some embodiments, the lock-in amplifier configured to, for the $\lambda_1$ signal, to lock on frequencies $f_0 \pm f_1$, thereby allowing to electronically separate the pump pulse $\lambda_1$ from the probe pulse $\lambda_1$.

According to some embodiments, the system further comprises a processor configured to receive the demodulated signals and to determine a 3D nanostructure of the target region of the sample based thereon.

According to some embodiments, the optical setup comprises: n−1 dichroic mirrors each of the n−1 dichroic mirrors having a cut-on wavelength $\lambda_m < \lambda_{cut-on} < \lambda_{m+1}$, wherein the $\lambda_m$ of each of the dichroic mirrors represents a different wavelength of the $\lambda_1$-$\lambda_n$ wavelengths; and n optical elements (BS) each optically coupled to a respective detector of the n detectors and to an associated dichroic mirror of the n−1 dichroic mirrors, wherein each of the n optical elements (BS) is configured to direct light reflected from the sample, through the respective dichroic mirror, to the respective detector. According to some embodiments, the optical setup further comprises n−2 deflecting optical elements (M) optically associated with the n−1 dichroic mirrors, wherein each of the n−2 deflecting optical elements (M) is configured to receive light reflected from or transmitted through a dichroic mirror positioned optically before the deflecting optical element (M) and deflect it onto a dichroic mirror positioned optically after the deflecting optical element; and to receive light reflected from the dichroic mirror positioned optically after the deflecting optical element (M) and deflect it onto the dichroic mirror positioned optically before the deflecting optical element (M).

According to some embodiments, the n optical elements are beam splitters.

According to some embodiments, the n−1 dichroic mirrors are long-pass dichroic mirrors, short-pass dichroic mirrors or band-pass mirrors. Each possibility is a separate embodiment.

According to some embodiments, the optical elements are selected from mirrors, right-angled prisms, diffracting optical element or any combination thereof. Each possibility is a separate embodiment. According to some embodiments, all of the some of the n−2 deflective optical elements (M) are of a same type (e.g. mirrors). According to some embodiments, some of the n−2 deflective optical elements (M) are of one type and other of another type (e.g., some mirrors and some right-angled prisms).

According to some embodiments, the optical setup comprises a chromatic splitter configured to combine the $\lambda_1$-$\lambda_n$ wavelengths prior to reaching the sample and to separate the $\lambda_1$-$\lambda n$ wavelengths reflected from the sample prior to reaching the n detectors. According to some embodiments, the optical setup further comprises n optical elements (BS) each optically coupled to a respective detector of the n detectors, wherein each of the n optical elements (BS) is configured to direct light reflected from the sample, through the chromatic splitter, to the respective detector. According to some embodiments, the optical setup further comprises n deflecting optical elements (M) optically associated with the n optical elements and with the diffraction grating or the prism, wherein each of the n deflecting optical elements is configured to receive light transmitted through the associated optical element (BS) and to deflect it onto the sample via the chromatic splitter; and to receive light reflected from the sample, via the chromatic splitter, and deflect it onto the respective detector of the n detectors.

According to embodiments, the lock-in amplifier is a single lock-in amplifier with n entries. According to embodiments, the optical setup comprises n lock-in amplifiers. According to some embodiments, the optical setup comprises more than one but less than n lock-in amplifiers, each lock-in amplifier having more than one but less than n entries.

According to embodiments, the time delay configuration is positioned the pump line optical path. According to embodiments, the time delay configuration comprises n time delay configurations each positioned at a different of the n probe source optical paths.

According to embodiments, the time delay configuration $\lambda_1 < \lambda_2 < \lambda_3 \ldots < \lambda_n$. According to embodiments, the time delay configuration $\lambda_1 > \lambda_2 > \lambda_3 \ldots > \lambda_n$.

According to some embodiments, there is provided a method for in-depth profiling of a patterned wafer sample, the method comprising: providing a patterned wafer sample comprising a target region; projecting an optical pump pulse on the sample, such as to produce an acoustic pulse, which propagates within the target region of the sample, projecting a plurality of optical probe pulses on the sample, such that the probe pulse undergoes Brillouin scattering off the acoustic pulse within the target region; wherein each of the plurality of probe pulses has a different wavelength ($\lambda_1$-$\lambda_n$); passing each of the plurality of probe pulses through an optical setup configured to combine the plurality of probe pulses, such that they simultaneously reach the same target region of the sample and to separate the plurality of probe pulses upon their reflection from the sample, such that each of the plurality of probe pulses is detected by a separate detector; and analyzing the detected signals to obtain a 3D nanostructure of the target region of the sample.

According to some embodiments, projecting the optical pump pulse further comprises modulating the pump pulse at a frequency $f_0$ using a modulator and generating a time delay between the pump pulse and the probe pulses using a time delay configuration, prior to passing on the pump pulse to the optical setup.

According to some embodiments, the method further comprises demodulating the signals detected by the detectors using a lock-in amplifier locked-in on $f_0$, thus removing background noise therefrom and decoupling optical and acoustic properties of the sample.

According to some embodiments, the pump pulse has a wavelength $\lambda_0$.

According to some embodiments, $\lambda_1$ is further used as the pump pulse by splitting the beam of probe source n=1, into a probe pulse $\lambda_1$ and pump pulse $\lambda_1$.

According to some embodiments, the method further comprises modulating the probe pulse $\lambda_1$ at a frequency $f_1$ and demodulating the $\lambda_1$ signal, using the lock-in amplifier, by locking on frequencies $f_0 \pm f_1$, thereby allowing to electronically separate the pump pulse $\lambda_1$ from the probe pulse $\lambda_1$.

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles "a" and "an" mean "at least one" or "one or more" unless the context clearly dictates otherwise.

Unless specifically stated otherwise, as apparent from the disclosure, it is appreciated that, according to some embodiments, terms such as "processing", "computing", "calculating", "determining", "estimating", "assessing", "gauging" or the like, may refer to the action and/or processes of a computer or computing system, or similar electronic computing device, that manipulate and/or transform data, represented as physical (e.g. electronic) quantities within the computing system's registers and/or memories, into other data similarly represented as physical quantities within the computing system's memories, registers or other such information storage, transmission or display devices.

Embodiments of the present disclosure may include apparatuses for performing the operations herein. The apparatuses may be specially constructed for the desired purposes or may include a general-purpose computer(s) selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method(s). The desired structure(s) for a variety of these systems appear from the description below. In addition, embodiments of the present disclosure are not described with reference to any particular programming language. It will be appreciated that a variety of programming languages may be used to implement the teachings of the present disclosure as described herein.

Aspects of the disclosure may be described in the general context of computer-executable instructions, such as program modules, being executed by a computer. Generally, program modules include routines, programs, objects, components, data structures, and so forth, which perform particular tasks or implement particular abstract data types. Disclosed embodiments may also be practiced in distributed computing environments where tasks are performed by remote processing devices that are linked through a communications network. In a distributed computing environment, program modules may be located in both local and remote computer storage media including memory storage devices.

BRIEF DESCRIPTION OF THE DRAWINGS

Some embodiments of the disclosure are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the disclosure.

For the sake of clarity, some objects depicted in the figures are not drawn to scale. Moreover, two different objects in the same figure may be drawn to different scales. In particular, the scale of some objects may be greatly exaggerated as compared to other objects in the same figure.

In the figures:

Figure 1:
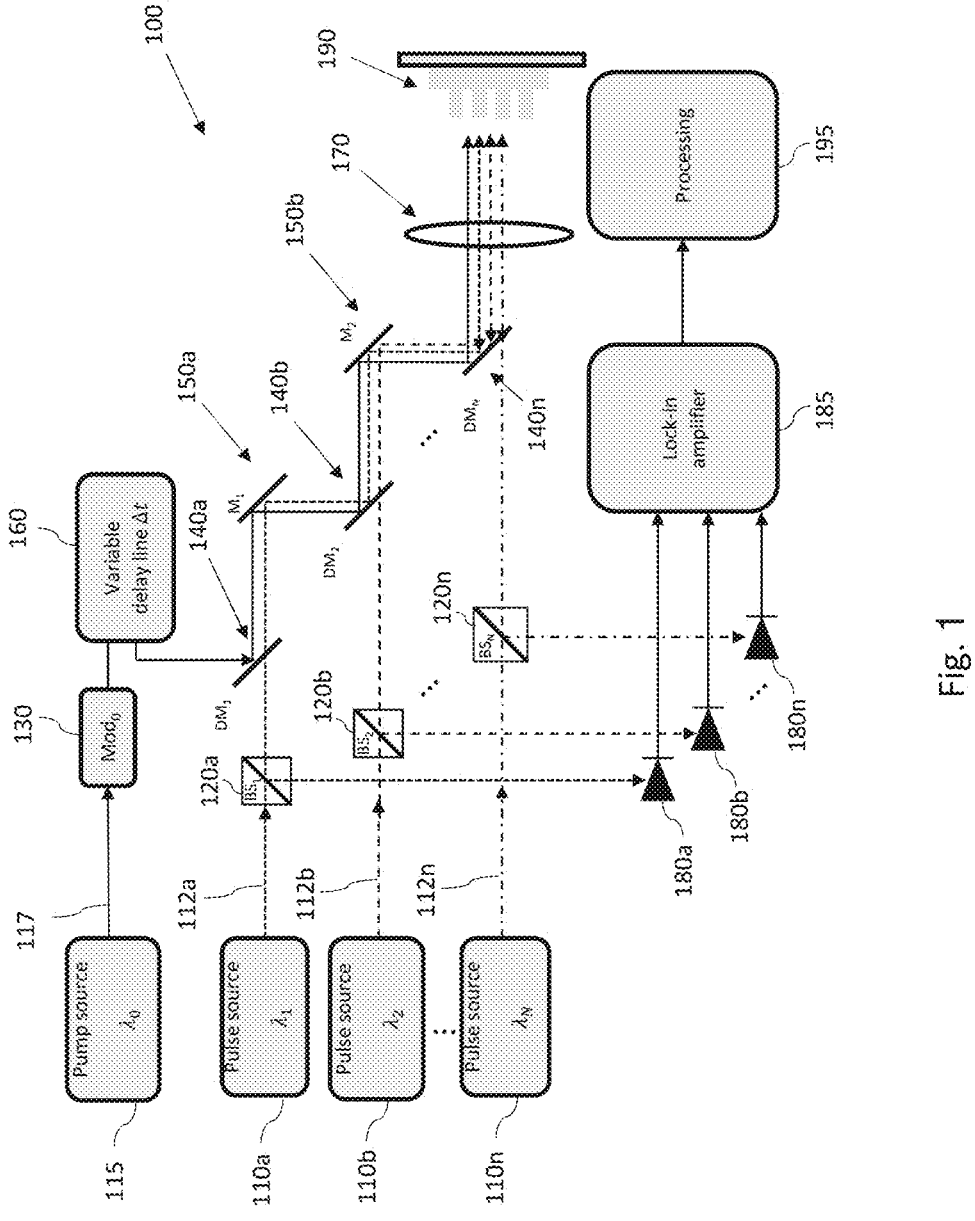
Figure 2:
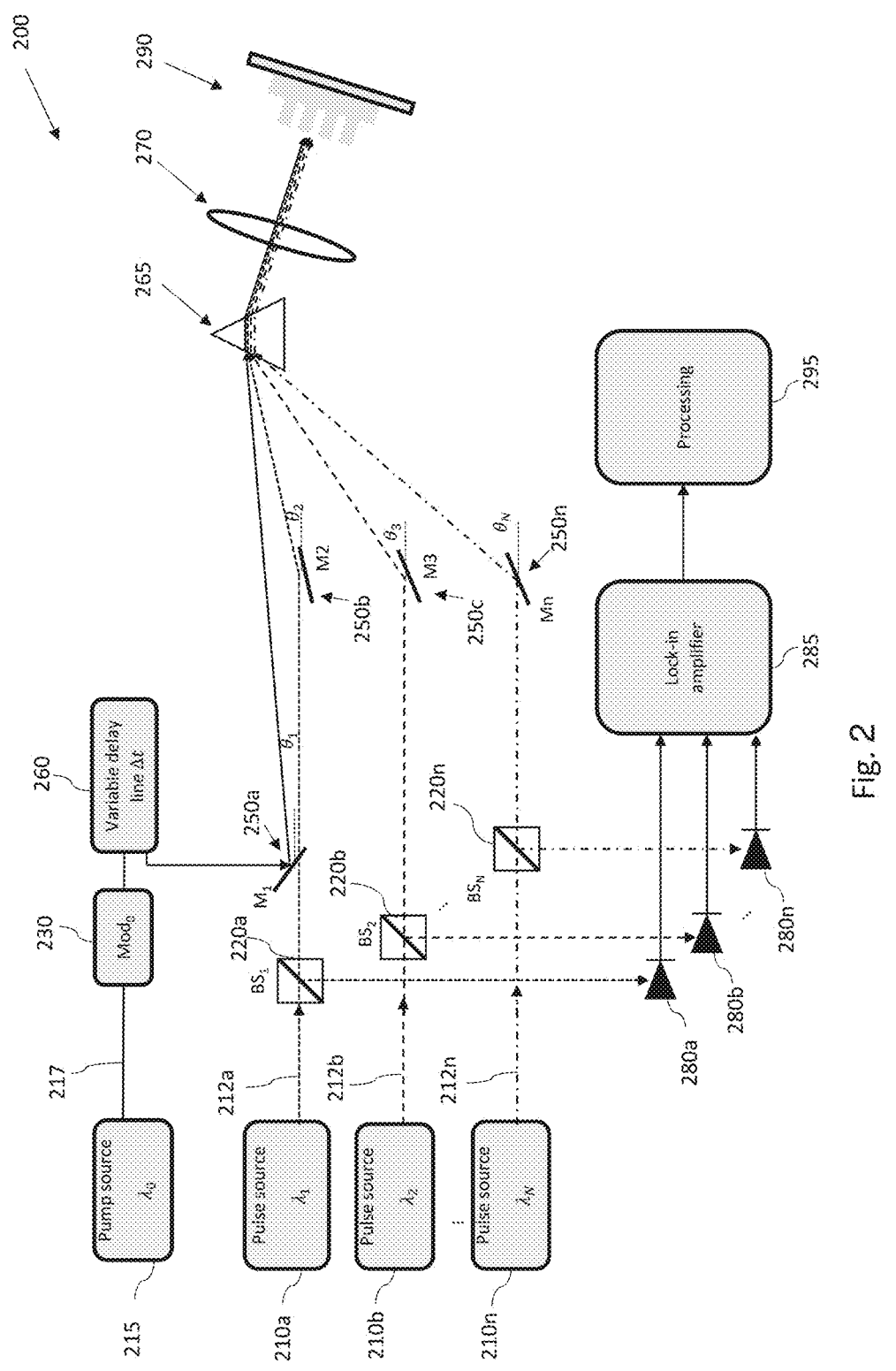
Figure 3:
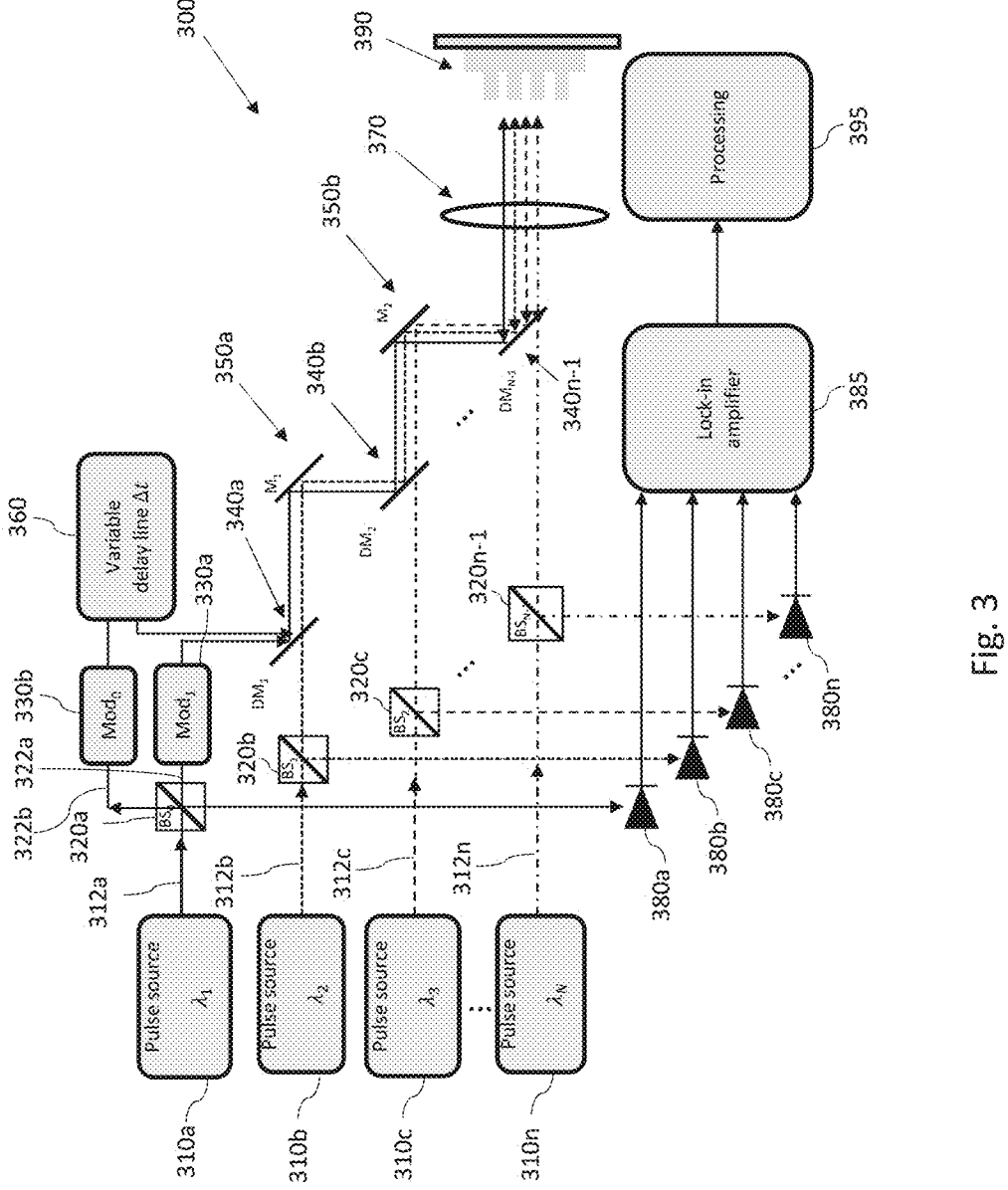
Figure 4:
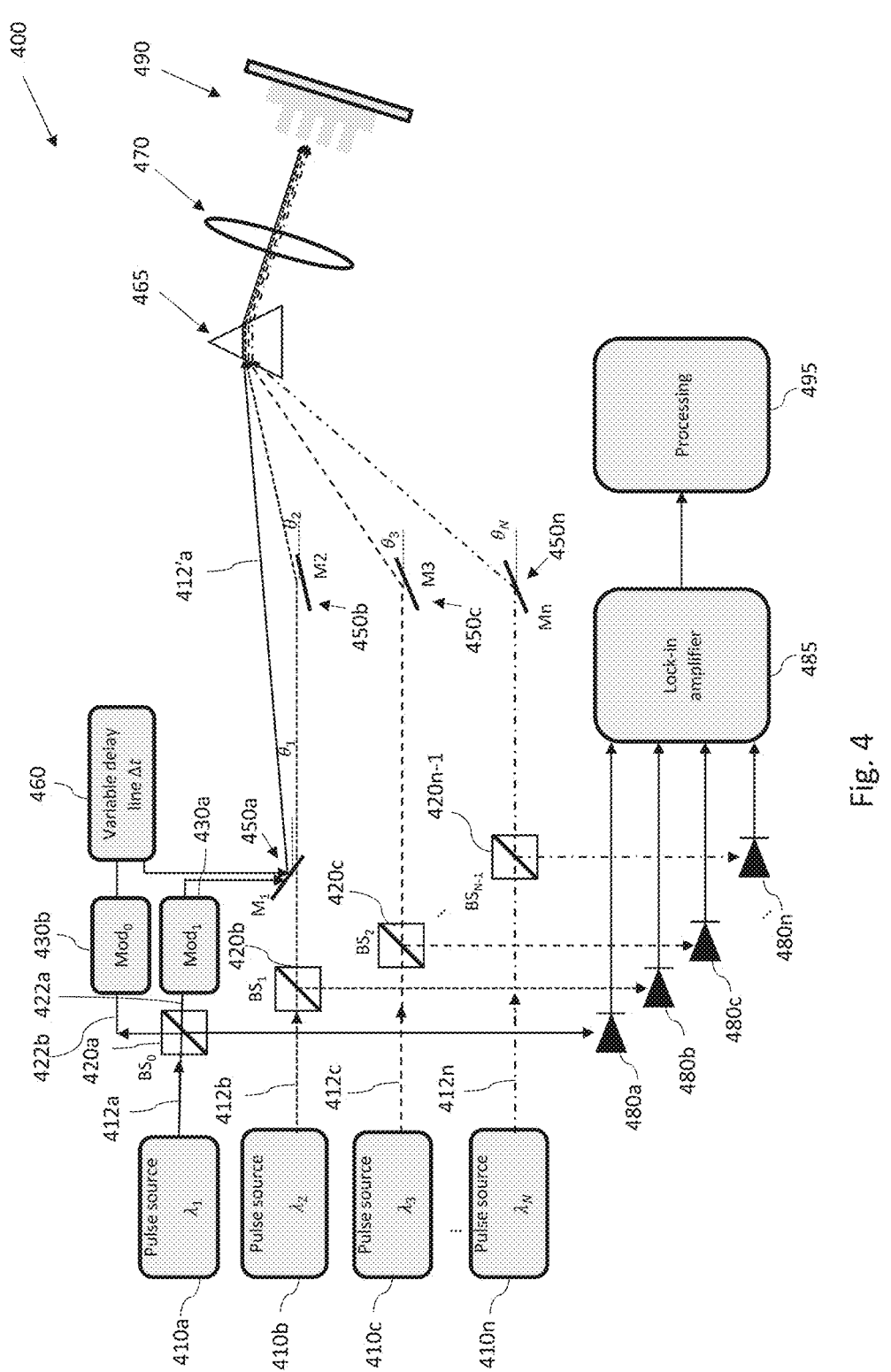

FIG. 1 schematically illustrates an optional optical setup of the herein disclosed system for in-depth profiling of a patterned wafer sample including a pump source and multiple pulse sources; according to some embodiments;

FIG. 2 schematically illustrates another optional optical setup of the herein disclosed system for in-depth profiling of a patterned wafer sample including a pump source and multiple pulse sources; according to some embodiments;

FIG. 3 schematically illustrates an optional optical setup of the herein disclosed system for in-depth profiling of a patterned wafer sample including a combined pump and probe source; according to some embodiments;

FIG. 4 schematically illustrates an optional optical setup of the herein disclosed system for in-depth profiling of a patterned wafer sample including a combined pump and probe source; according to some embodiments;

FIG. 5 of the therein disclosed method for in-depth profiling of a patterned wafer sample, according to some embodiments;

FIG. 6 of the therein disclosed method for in-depth profiling of a patterned wafer sample, according to some embodiments; and FIG. 7 of the therein disclosed method for in-depth profiling of a patterned wafer sample, according to some embodiments.

DETAILED DESCRIPTION OF THE INVENTION

The principles, uses, and implementations of the teachings herein may be better understood with reference to the accompanying description and figures. Upon perusal of the description and figures present herein, one skilled in the art will be able to implement the teachings herein without undue effort or experimentation. In the figures, same reference numerals refer to same parts throughout.

Reference is now made to FIG. 1 to FIG. 4, which schematically illustrate optional optical setups of the herein disclosed system for in-depth profiling of patterned wafer samples. It is understood by one of ordinary skill in the art, that these setups are exemplary, and that other optical setups and including other optical elements can be implemented, and as such are within the scope of this disclosure.

Reference is now made to FIG. 1, which schematically illustrates an optional optical setup 100 of the herein disclosed system for in-depth profiling of a patterned wafer sample 190, according to some embodiments. Optical setup 100 includes n probe sources 110a- . . . n (for simplicity only probe sources 110a, 110b and 110n are shown), each configured to simultaneously emit pulsed light beams 112a- . . . n having a different wavelength ($\lambda_1$-$\lambda_n$) respectively. While not strictly necessary, it is assumed that $\lambda_1 < \lambda_2 < \lambda_3 . . . < \lambda_n$.

In addition, optical setup 100 includes a pump source 115 configured to transmit pump pulse 117 at a wavelength $\lambda_0$.

Pump pulse 117 is modulated by a modulator $Mod_0$ 130 at a frequency $f_0$ and directed to a variable delay line 160 configured to generate a time delay $\Delta t$ between pump pulse 117 and probe pulses 112a . . . n.

Pulsed light beam 112a-112n are transmitted simultaneously, at the time delay $\Delta t$ relative to pump pulse 117.

Pulsed light beam 112a is transmitted through an optically associated optical element, here exemplified as a beam splitter ($BS_1$) 120a, and through an optically associated dichroic mirror $DM_1$ 140a having a cut-on wavelength $\lambda_1 < \lambda_{cut-on} < \lambda_2$. From there, pulsed light beam 112a is deflected by an optical deflecting element, here a mirror $M_1$ 150a to dichroic mirror $DM_2$ 140b having a cut-on wavelength $\lambda_2 < \lambda_{cut-on} < \lambda_3$ and further to mirror $M_2$ 150b etc. until reaching dichroic mirror $DM_n$ 140n having a cut-on wavelength $\lambda_n < \lambda_{cut-on} < \lambda_{n+1}$, from where it is projected onto the target region of sample 190, optionally via objective 170.

Similarly, pulsed light beams 112b-112n are transmitted through their optically associated optical elements, here exemplified as beam splitters ($BS_2$ to $BS_n$) 120b-120n, and through optically associated dichroic mirrors $DM_2$ 140b to $DM_n$ 140n etc, from where they are projected onto the target region of sample 190.

Modulated pump pulse 117 is projected onto a dichroic mirror $DM_1$ 140a (other suitable optical elements are likewise envisaged) and further until reaching dichroic mirror $DM_n$ 140n, thereby allowing modulated pump pulse 117 to be projected onto sample 190.

Upon impinging on sample 190, pulsed light beams 112a-112n are reflected from sample 190, via objective 170 to dichroic mirror $DM_n$ 140n.

Reflected light beam 112n which has a wavelength longer than the cut-on value of $DM_n$ 140n is transmitted through $DM_n$ 140n to optical element $BS_n$ 120n from where it is projected onto detector 180n.

Reflected light beams 112a-b- . . . n−1 (as well as reflected light beams c−n−1—not shown) which have wavelengths shorter than the cut-on value of $DM_n$ 140n are reflected by $DM_n$ 140n to mirror $M_2$ 150b and further to dichroic mirror $DM_2$ 140b. Light beam 112b which has a longer wavelength than the cut-on value of $DM_2$ 140b is transmitted through $DM_2$ 140b via optical element $BS_2$ 120b to detector 180b. Light beam 112a on the other hand, which has a shorter wavelength than the cut-on value of $DM_2$ 140b is reflected by $DM_2$ 140b to deflecting optical element $M_1$ 150a and further to dichroic mirror $DM_1$ 140a, via beam splitter $BS_1$ 120a, to detector 180a. It is understood by one of ordinary skill in the art that light beams 112c-n−1 (not shown) are deflected by additional dichroic mirrors and mirrors until reaching a dichroic mirror which has a cut-on value lower than the wavelength of the beam, in which case it is transmitted to its associated detector, such that all reflected light beams reach a different detector of the n detectors. Furthermore, it is also understood by one of ordinary skill in the art that while dichroic mirrors 140a-140n are depicted in this schematic as long-pass dichroic mirrors, short-pass or band-pass mirrors may likewise be used in a corresponding configuration and are as such incorporated within this disclosure.

Signals, detected by detectors 180a- . . . n are transmitted to a lock-in amplifier 185 (either to independent entries of a same lock-in amplifier or to n separate lock-in amplifiers or a combination thereof). Lock-in amplifier 185 demodulates the signals of detectors 180a-180n by locking in on $f_0$, thus removing background noise therefrom and allowing to detect the acoustic effect generated by pump pulse 117, while removing background optical signal.

The demodulated signals are then sent to a processor 195 for further processing to determine a 3D nanostructure of the target region of the sample based thereon.

The benefit of using multiple wavelengths is that, for some materials, the refractive index depends on probe wavelength, whereas the speed of sound is fixed for all probes. The local frequency is different for each probe, and all signals can be processed together to improve the estimation. In vector form, the local frequencies can be expressed as:

$$\vec{f}(z) = 2V_{sound}(z)\begin{pmatrix} n(\lambda, z)/\lambda_1 \\ n(\lambda_2, z)/\lambda_2 \\ \vdots \\ n(\lambda_N, z)/\lambda_N \end{pmatrix}$$

Using multiple wavelengths has two main advantages: first the number of equations is N and the number of unknowns is N+1 (N values for refractive index plus one value for speed of sound). Therefore, as the number of measurement wavelengths increases, the system of equations becomes more solvable. Second, most materials have known dispersion curves (i.e., the wavelength dependence of the refractive index). Since the effective index properties of a nanometric structure is complex, using multiple wavelengths helps to differentiate between parts of the effective index $n(\lambda_1 \ldots \lambda_N, z)$ which are dependent on the material itself, and part that are dependent on the geometry of the structure.

Reference is now made to FIG. 2, which schematically illustrates another optional optical setup 200 of the herein disclosed system for in-depth profiling of a patterned wafer sample 290, according to some embodiments. Optical setup 200 includes n probe sources 210a- . . . n (for simplicity only probe sources 210a, 210b, and 210n are shown), each configured to simultaneously emit pulsed light beams 212a- . . . n having a different wavelength $(\lambda_1-\lambda_n)$ respectively. While not strictly necessary, it is assumed that $\lambda_1 < \lambda_2 < \lambda_3 \ldots < \lambda_n$.

In addition, optical setup 200 includes a pump source 215 configured to transmit pump pulse 217 at a wavelength $\lambda_0$.

Pump pulse 217 is modulated by a modulator $Mod_0$ 230 at a frequency $f_0$ and directed to a variable delay line 260 configured to generate a time delay $\Delta t$ between pump pulse 217 and probe pulses 212a . . . n.

Modulated probe pulse 217 is projected onto a deflective optical element, here a mirror $M_1$ 250a (other suitable optical elements are likewise envisaged), thereby allowing modulated pump pulse 217 to be reflected onto a chromatic splitter 265 (e.g., a diffraction grating or a prism) at a first angle $\Theta_1$.

Pulsed light beam 212a-212n are transmitted simultaneously, at the time delay $\Delta t$ relative to pump pulse 217, through optical elements $BS_1-BS_n$ 220a-220n towards deflecting optical elements (here mirrors $M_2-M_n$) 250b-250n for them to be deflected at angles $\Theta_2-\Theta_n$ onto chromatic splitter 265.

Chromatic splitter 265 combines deflected light beams 212a-212n and projects them, via an objective 270 onto sample 290.

Upon impinging on sample 290, light beams 212a-212n are reflected from sample 290, via objective 270, to chromatic splitter 265 which separates the beams, such that each of beams 212a-212n reaches a different of detectors 280a- . . . n.

Signals detected by detectors 280a- . . . n are transmitted to a lock-in amplifier 285 (either to independent entries of a same lock-in amplifier or to n separate lock-in amplifiers or a combination thereof). Lock-in amplifier 285 demodulates the signals of detectors 280a-280n by locking in on $f_0$, thus removing background noise therefrom and allowing to detect the acoustic effect generated by pump pulse 217, while removing background optical signal.

The demodulated signals are then sent to a processor 295 for further processing to determine a 3D nanostructure of the target region of the sample based thereon.

The benefit of using multiple wavelengths is that, for some materials, the refractive index depends on probe wavelength, whereas the speed of sound is fixed for all probes. The local frequency is different for each probe, and all signals can be processed together to improve the estimation. In vector form, the local frequencies can be expressed as:

$$\vec{f}(z) = 2V_{sound}(z)\begin{pmatrix} n(\lambda_1, z)/\lambda_1 \\ n(\lambda_2, z)/\lambda_2 \\ \vdots \\ n(\lambda_N, z)/\lambda_N \end{pmatrix}$$

Using multiple wavelengths has two main advantages: first the number of equations is N and the number of unknowns is N+1 (N values for refractive index plus one value for speed of sound). Therefore, as the number of measurement wavelengths increases, the system of equations becomes more solvable. Second, most materials have known dispersion curves (i.e., the wavelength dependence of the refractive index). Since the effective index properties of a nanometric structure is complex, using multiple wavelengths helps to differentiate between parts of the effective index $n(\lambda_1 \ldots \lambda_N, z)$ which are dependent on the material itself, and part that are dependent on the geometry of the structure.

Reference is now made to FIG. 3, which schematically illustrates yet another optional optical setup 300 of the herein disclosed system for in-depth profiling of a patterned wafer sample 390, according to some embodiments. Optical setup 300 includes n probe sources 310a- . . . n (for simplicity only probe sources 310a, 310b, 310c and 310n are shown), each configured to simultaneously emit pulsed light beams 312a- . . . n having a different wavelength $(\lambda_1-\lambda_n)$ respectively. While not strictly necessary, it is assumed that $\lambda_1 < \lambda_2 < \lambda_3 < \lambda_n$.

Pulsed light beam 312a is split, by an optical element, here exemplified as a beam splitter $(BS_0)$ 320a, into a probe pulse 322a and pump pulse 322b both having the wavelength $\lambda_1$. Pump pulse 322b is modulated by a modulator $Mod_0$ 330b at a frequency $f_0$ and probe pulse 322a is modulated by a modulator $Mod_1$ 330a at a frequency $f_1$. Pump pulse 322b is further directed to a variable delay line 360 configured to generate a time delay $\Delta t$ relative to probe pulse 322a. Modulated probe pulse 322a and modulated pump pulse 322b are projected onto a dichroic mirror $DM_1$ 340a (or other suitable optical element). $DM_1$ has a cut-on wavelength $\lambda_1 < \lambda_{cut-on} < \lambda_2$, thereby allowing modulated probe pulse 322a and modulated pump pulse 322b to be transmitted therethrough towards an optical element configured to deflect modulated probe pulse 322a and modulated pump pulse 322b through objective 370 and onto a target region of sample 390.

Pulsed light beam 312*b* is transmitted through an optically associated optical element, here exemplified as a beam splitter (BS$_1$) 320*b*, and through optically associated dichroic mirrors DM$_1$ 340*a*. From there, pulsed light beam 312*b* is deflected by an optical deflecting element, here a mirror M$_1$ 350*a* to dichroic mirror DM$_2$ 340*b* having a cut-on wavelength $\lambda < \lambda_{cut-on} < \lambda_3$ etc. until reaching dichroic mirror DM$_1$ 340*n* having a cut-on wavelength $\lambda < \lambda_{cut-on} < \lambda_{n+1}$, from where it is projected onto the target region of sample 390. Similarly, pulsed light beams 312*c*-312*n* are transmitted through their optically associated optical elements, here exemplified as beam splitters (BS$_2$ to B$_{n-1}$) 320*b*-320*n*, and through optically associated dichroic mirrors DM$_2$ 340*b* to DM$_{n-1}$340*n*−1. From there, pulsed light beams 312*c*-312*n* are deflected by optical deflecting elements, here mirror M$_2$ 350*b* to M$_{n-2}$ (not shown), to dichroic mirrors DM$_3$ (not shown) etc. until reaching dichroic mirror DM$_{n-1}$ 340*n*−1, from where they are projected onto the target region of sample 390.

Upon impinging on sample 390, pulsed light beams 312'*a*-312*n* are reflected from sample 390, via objective 370 to dichroic mirror DM$_{n-1}$ 340*n*−1.

Reflected light beam 312*n* which has a wavelength longer than the cut-on value of DM$_{n-1}$ 340*n*−1 is transmitted through DM$_{n-1}$ 340*n*−1 to optical element BS$_{n-1}$ 320*n*−1 from where it is projected onto detector 380*n*.

Reflected light beams 312*a*-*c* (as well as reflected light beams d−n−1—not shown) which have wavelengths shorter than the cut-on value of DM$_{n-1}$ 340*n*−1 are reflected by DM$_{n-1}$ 340*n*−1 to mirror M$_2$ 350*b* and further to dichroic mirror DM$_2$ 340*b*. Light beam 312*c* which has a shorter wavelength than the cut-on value of DM$_2$ 340*b* is transmitted through DM$_2$ 340*b* via optical element BS$_2$ 320*b* to detector 380*b*. Light beams 312*a* and 312*b* on the other hand, which have wavelengths longer than the cut-on value of DM$_2$ 340*b* are reflected by DM$_2$ 340*b* to deflecting optical element M$_1$ 350*a* etc. It is understood by one of ordinary skill in the art that light beams 312*d*-*n*−1 (not shown) are deflected by additional dichroic mirrors until reaching a dichroic mirror which has a cut-on value lower than the wavelength of the beam, in which case it is transmitted to its associated detector, such that all reflected light beams reach a different detector of the n detectors. Furthermore, it is also understood by one of ordinary skill in the art that while dichroic mirrors 340*a*-340*n*−1 are depicted in this schematic as long-pass dichroic mirrors, however short-pass or band-pass mirrors may likewise be used in a corresponding configuration and are as such incorporated within this disclosure.

Signals detected by detectors 380*a*- . . . n are transmitted to a lock-in amplifier 385 (either to independent entries of a same lock-in amplifier or to n separate lock-in amplifiers or a combination thereof). Lock-in amplifier 385 demodulates the signals of detectors 380*b*-380*n* (receiving wavelengths $\lambda_2$-$\lambda_n$) by locking in on $f_0$, thus removing background noise therefrom and allowing to detect the acoustic effect generated by pump pulse 322*b*, while removing background optical signal. For signals obtained from detector 380*a* (receiving wavelength $\lambda_1$), lock-in amplifier 385 locks on frequencies $f_0 \pm f_1$, thereby allowing to electronically separate the pump pulse $\lambda_1$ from the probe pulse $\lambda_1$.

The demodulated signals are then sent to a processor 395 for further processing to determine a 3D nanostructure of the target region of the sample based thereon.

The benefit of using multiple wavelengths is that, for some materials, the refractive index depends on probe wavelength, whereas the speed of sound is fixed for all probes. The local frequency is different for each probe, and all signals can be processed together to improve the estimation. In vector form, the local frequencies can be expressed as:

$$\vec{f}(z) = 2V_{sound}(z)\begin{pmatrix} n(\lambda_1, z)/\lambda_1 \\ n(\lambda_2, z)/\lambda_2 \\ \vdots \\ n(\lambda_N, z)/\lambda_N \end{pmatrix}$$

Using multiple wavelengths has two main advantages: first the number of equations is N and the number of unknowns is N+1 (N values for refractive index plus one value for speed of sound). Therefore, as the number of measurement wavelengths increases, the system of equations becomes more solvable. Second, most materials have known dispersion curves (i.e., the wavelength dependence of the refractive index). Since the effective index properties of a nanometric structure is complex, using multiple wavelengths helps to differentiate between parts of the effective index $n(\lambda_1 . . . \lambda_N, z)$ which are dependent on the material itself, and part that are dependent on the geometry of the structure.

Reference is now made to FIG. 4, which schematically illustrates yet another optional optical setup 400 of the herein disclosed system for in-depth profiling of a patterned wafer sample 490, according to some embodiments. Optical setup 400 includes n probe sources 410*a*- . . . n (for simplicity only probe sources 410*a*, 410*b*, 410*c* and 410*n* are shown), each configured to simultaneously emit pulsed light beams 412*a*- . . . n having a different wavelength ($\lambda_1$-$\lambda_n$) respectively. While not strictly necessary, it is here assumed that $\lambda_1 < \lambda_2 . . . < \lambda_n$.

Pulsed light beam 412*a* is split, by an optical element, here exemplified as a beam splitter (BS$_0$) 420*a*, into a probe pulse 422*a* and pump pulse 422*b* both having the wavelength $\lambda_1$. Pump pulse 422*b* is modulated by a modulator Mod$_0$ 430*b* at a frequency $f_0$ and probe pulse 422*a* is modulated by a modulator Mod$_1$ 430*a* at a frequency $f_1$. Pump pulse 422*b* is further directed to a variable delay line 460 configured to generate a time delay $\Delta t$ relative to probe pulse 422*a*. Modulated probe pulse 422*a* and modulated pump pulse 422*b* are projected onto a deflective optical element, here a mirror M$_1$ 450*a* (other suitable optical elements are likewise envisaged), thereby allowing modulated probe pulse 422*a* and modulated pump pulse 422*b* to be reflected onto a chromatic splitter 465 (e.g. a diffraction grating or a prism) at a first angle $\Theta_1$.

Light beams 412*b*-412*n* on the other hand, are transmitted directly through optical elements BS$_1$-BS$_{n-1}$ 420*b*-420*n*−1 towards optical elements (here mirrors M$_2$-M$_n$) 450*b*-450*n* for them to be deflected at angles $\Theta_2$-$\Theta_n$ onto chromatic splitter 465.

Chromatic splitter 465 combines deflected light beams 412'*a*-412*n* and projects them, via an objective 470 onto sample 490.

Upon impinging on sample 490, pulsed light beams 412'*a*-412*n* are reflected from sample 490, via objective 470 to chromatic splitter 465 which separates the beams, such that each of beams 412'*a*-412*n* reach a different of detectors 480*a*- . . . n.

Signals detected by detectors 480*a*- . . . n are transmitted to a lock-in amplifier 485 (either to independent entries of a same lock-in amplifier or to n separate lock-in amplifiers or a combination thereof). Lock-in amplifier 485 demodulates the signals of detectors 480b-480n (receiving wavelengths $\lambda_2$-$\lambda_n$) by locking in on $f_0$, thus removing background noise therefrom and allowing to detect the acoustic effect generated by pump pulse 422b, while removing background optical signal. For signals obtained from detector 480a (receiving wavelength $\lambda_1$), lock-in amplifier 485 locks on frequencies $f_0 \pm f_1$, thereby allowing to electronically separate the pump pulse $\lambda_1$ from the probe pulse $\lambda_1$.

The demodulated signals are then sent to a processor 495 for further processing to determine a 3D nanostructure of the target region of the sample based thereon.

The benefit of using multiple wavelengths is that, for some materials, the refractive index depends on probe wavelength, whereas the speed of sound is fixed for all probes. The local frequency is different for each probe, and all signals can be processed together to improve the estimation. In vector form, the local frequencies can be expressed as:

$$\vec{f}(z) = 2V_{sound}(z)\begin{pmatrix} n(\lambda_1, z)/\lambda_1 \\ n(\lambda_2, z)/\lambda_2 \\ \vdots \\ n(\lambda_N, z)/\lambda_N \end{pmatrix}$$

Using multiple wavelengths has two main advantages: first the number of equations is N and the number of unknowns is N+1 (N values for refractive index plus one value for speed of sound). Therefore, as the number of measurement wavelengths increases, the system of equations becomes more solvable. Second, most materials have known dispersion curves (i.e., the wavelength dependence of the refractive index). Since the effective index properties of a nanometric structure is complex, using multiple wavelengths helps to differentiate between parts of the effective index $n(\lambda_1 \ldots \lambda_N, z)$ which are dependent on the material itself, and part that are dependent on the geometry of the structure.

Reference is now made to FIG. 5 to FIG. 7 which are exemplary flowcharts of the therein disclosed method for in-depth profiling of a patterned wafer sample, according to some embodiments. It is understood to one of ordinary skill in the art, that while the steps are depicted as being sequential some are (optionally or necessarily) conducted simultaneously. Similarly, the orders of some of the steps may (as understood by one of ordinary skill in the art) be changed.

Reference is now made to FIG. 5 which is an exemplary flowchart 500 of the therein disclosed method for in-depth profiling of a patterned wafer sample.

In step 510, a patterned wafer sample comprising a target region is provided.

In step 520, an optical pump pulse is projected on the sample, so as to produce an acoustic pulse, which propagates within the target region of the sample.

In step 520, a plurality of optical probe pulses, each having a different wavelength ($\lambda_1$-$\lambda_n$) are projected on the sample, such that the probe pulses undergo Brillouin scattering off the acoustic pulse within the target region.

In step 530, each of the plurality of probe pulses are passed through an optical setup configured to combine the plurality of probe pulses, such that they simultaneously reach the same target region of the sample and to separate the plurality of probe pulses upon their reflection from the sample, such that each of the plurality of probe pulses is detected by a separate detector.

In step 540, the detected signals are processed to obtain a 3D nanostructure of the target region of the sample.

Reference is now made to FIG. 6 which is an exemplary flowchart 600 of the therein disclosed method for in-depth profiling of a patterned wafer sample.

In step 610, a patterned wafer sample comprising a target region is provided.

In step 620, an optical pump pulse having a wavelength $\lambda_0$ is provided.

In step 630, the pump pulse is modulated at a frequency $f_0$ using a modulator.

In step 640, a time delay is generated between the probe pulses (see step 660) and the pump pulse using a time delay configuration/element.

In step 650, the pump pulse is projected on the sample, so as to produce an acoustic pulse, which propagates within the target region of the sample.

In step 660, a plurality of optical probe pulses, each having a different wavelength ($\lambda_1$-$\lambda_n$) are provided.

In step 670, each of the plurality of probe pulses are passed through an optical setup configured to combine the plurality of probe pulses, such that they simultaneously reach the same target region of the sample and to separate the plurality of probe pulses upon their reflection from the sample, such that each of the plurality of probe pulses is detected by a separate detector; wherein the probe pulses undergo Brillouin scattering off the acoustic pulse within the target region.

In step 680, the detected signals are demodulated using a lock-in amplifier locked-in on frequency $f_0$, thus removing background noise therefrom and decoupling optical and acoustic properties of the sample.

In step 690, the demodulated signals are processed to obtain a 3D nanostructure of the target region of the sample.

Reference is now made to FIG. 7 which is an exemplary flowchart 700 of the therein disclosed method for in-depth profiling of a patterned wafer sample.

In step 710, a patterned wafer sample comprising a target region is provided.

In step 720, a plurality of optical probe pulses, each having a different wavelength ($\lambda_1$-$\lambda_n$) are provided.

In step 730, the beam of probe source n=1 having the wavelength $\lambda_1$ is split into a probe pulse $\lambda_1$ and pump pulse $\lambda_1$.

In step 740, the probe pulse $\lambda_1$ is modulated at a frequency $f_1$ and the pump pulse $\lambda_1$ is modulated at a frequency $f_0$.

In step 750, a time delay is generated between the probe pulses and the pump pulse using a time delay configuration/element.

In step 760, the pump pulse is projected on the sample, so as to produce an acoustic pulse, which propagates within the target region of the sample.

In step 770, each of the plurality of probe pulses are passed through an optical setup configured to combine the plurality of probe pulses, such that they simultaneously reach the same target region of the sample and to separate the plurality of probe pulses upon their reflection from the sample, such that each of the plurality of probe pulses is detected by a separate detector; wherein the probe pulses undergo Brillouin scattering off the acoustic pulse within the target region.

In step 780, the detected signals of wavelength $\lambda_2$-$\lambda_n$ are demodulated using a lock-in amplifier locked-in on frequency $f_0$, thus removing background noise therefrom and decoupling optical and acoustic properties of the sample.

In step 790, the $\lambda_1$ signal is demodulated by locking-in on frequencies $f_0 \pm f_1$, thereby allowing to electronically separate the pump pulse $\lambda_1$ from the probe pulse $\lambda_1$.

In step 800, the demodulated signals are processed to obtain a 3D nanostructure of the target region of the sample.

In the description and claims of the application, the words "include" and "have", and forms thereof, are not limited to members in a list with which the words may be associated.

As used herein, the term "substantially" may be used to specify that a first property, quantity, or parameter is close or equal to a second or a target property, quantity, or parameter. For example, a first object and a second object may be said to be of "substantially the same length", when a length of the first object measures at least 80% (or some other pre-defined threshold percentage) and no more than 120% (or some other pre-defined threshold percentage) of a length of the second object. In particular, the case wherein the first object is of the same length as the second object is also encompassed by the statement that the first object and the second object are of "substantially the same length".

According to some embodiments, the target quantity may refer to an optimal parameter, which may in principle be obtainable using mathematical optimization software. Accordingly, for example, a value assumed by a parameter may be said to be "substantially equal" to the maximum possible value assumable by the parameter, when the value of the parameter is equal to at least 80% (or some other pre-defined threshold percentage) of the maximum possible value. In particular, the case wherein the value of the parameter is equal to the maximum possible value is also encompassed by the statement that the value assumed by the parameter is "substantially equal" to the maximum possible value assumable by the parameter.

As used herein, the term "about" may be used to specify a value of a quantity or parameter (e.g., the length of an element) to within a continuous range of values in the neighborhood of (and including) a given (stated) value. According to some embodiments, "about" may specify the value of a parameter to be between 80% and 120% of the given value.

For example, the statement "the length of the element is equal to about 1 m" is equivalent to the statement "the length of the element is between 0.8 m and 1.2 m". According to some embodiments, "about" may specify the value of a parameter to be between 90% and 110% of the given value. According to some embodiments, "about" may specify the value of a parameter to be between 95% and 105% of the given value.

As used herein, according to some embodiments, the terms "substantially" and "about" may be interchangeable.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. No feature described in the context of an embodiment is to be considered an essential feature of that embodiment, unless explicitly specified as such.

Although operations in disclosed methods, according to some embodiments, may be described in a specific sequence, methods of the disclosure may include some or all of the described operations carried out in a different order. A method of the disclosure may include a few of the operations described or all of the operations described. No particular operation in a disclosed method is to be considered an essential operation of that method, unless explicitly specified as such.

Although the disclosure is described in conjunction with specific embodiments thereof, it is evident that numerous alternatives, modifications and variations that are apparent to those skilled in the art may exist. Accordingly, the disclosure embraces all such alternatives, modifications and variations that fall within the scope of the appended claims. It is to be understood that the disclosure is not necessarily limited in its application to the details of construction and the arrangement of the components and/or methods set forth herein. Other embodiments may be practiced, and an embodiment may be carried out in various ways.

The phraseology and terminology employed herein are for descriptive purpose and should not be regarded as limiting. Citation or identification of any reference in this application shall not be construed as an admission that such reference is available as prior art to the disclosure. Section headings are used herein to ease understanding of the specification and should not be construed as necessarily limiting.

What is claimed is:

1. A pump-probe based system for in-depth profiling of a patterned wafer sample, the system comprising:

n probe sources each of the n probe sources configured to simultaneously emit light pulses at a different wavelength $(\lambda_1 - \lambda_n)$;

a pump source configured to transmit pump pulse at a wavelength $\lambda_0$;

n detectors each configured to detect a different one of wavelengths $\lambda_1 - \lambda_n$;

a pump modulator configured to modulate the pump pulse having the wavelength $\lambda_0$ at a frequency $f_0$;

a time delay configuration for generating a time delay between the pump pulse and the probe pulses;

an optical setup configured to: direct the modulated pump pulse on the target region of the sample, thereby producing an acoustic pulse propagating within the target region; direct the probe pulses to simultaneously impinge on the target region of the sample at the time delay relative to the pump pulse; and separate the light reflected from the sample, so that each of the $\lambda_1 - \lambda_n$ wavelengths of the reflected probe pulses are detected as separate signals by a respective of the n detectors;

a lock-in amplifier configured to demodulate the $\lambda_1 - \lambda_n$ signals detected by the respective n detectors by locking in on $f_0$, thus enabling detection of the acoustic effect generated by the pump pulse, while removing background optical signal; and a processor configured to receive the demodulated signals and to determine a 3D nanostructure of the target region of the sample based thereon.

2. The system of claim 1, wherein the optical setup comprises:

n dichroic mirrors each having a cut-on wavelength $\lambda_m < \lambda_{cut-on} < \lambda_{m+1}$, wherein the $\lambda_m$ of each of the dichroic mirrors represents a different wavelength of the $\lambda_1 - \lambda_n$ wavelengths; and n optical elements (BS) each optically coupled to a respective detector of the n detectors and to an associated dichroic mirror of the n dichroic mirrors, wherein each of the n optical elements (BS) is configured to direct light reflected from the sample, through the respective dichroic mirror, to the respective detector.

3. The system of claim 2, wherein the optical setup further comprises n−1 deflecting optical elements (M) optically associated with the n dichroic mirrors, wherein each of the n−1 deflecting optical elements (M) is configured to receive light reflected from or transmitted through a dichroic mirror positioned optically before the deflecting optical element (M) and deflect it onto a dichroic mirror positioned optically after the deflecting optical element (M); and to receive light reflected from the dichroic mirror positioned optically after the deflecting optical element (M) and deflect it onto the dichroic mirror positioned optically before the deflecting optical element (M).

4. The system of claim 1, wherein the optical setup comprises a chromatic splitter configured to combine the $\lambda_1$-$\lambda_n$ wavelengths prior to reaching the sample and to separate the $\lambda_1$-$\lambda_n$ wavelengths reflected from the sample prior to reaching the n detectors.

5. The system of claim 4, wherein the optical setup further comprises n optical elements (BS) each optically coupled to a respective detector of the n detectors, wherein each of the n optical elements (BS) is configured to transmit the n probe pulses therethrough to the chromatic splitter and onto the sample; and to direct light reflected from the sample, through the chromatic splitter, to the respective n detectors.

6. The system of claim 5, wherein the optical setup further comprises n deflecting optical elements (M) optically associated with the n optical elements (BS) and with the chromatic splitter, wherein each of the n deflecting optical elements (M) is configured to receive light transmitted through an associated optical element (BS) of the n optical element (BS) and to deflect it onto the sample via the chromatic splitter; and to receive light reflected from the sample, via the chromatic splitter, and deflect it onto the respective detector of the n detectors via the n optical element (BS).

7. The system of claim 1, wherein the time delay configuration is positioned the pump line optical path.

8. A pump-probe based system for depth-profiling of a patterned wafer sample, the system comprising:
  n probe sources each of the n probe sources configured to simultaneously emit light pulses at a different wavelength ($\lambda_1$-$\lambda_n$), wherein $\lambda_1$ is further used as a pump pulse for producing an acoustic pulse, which propagates within a target region of the sample;
  n detectors each configured to detect a different one of wavelengths $\lambda_1$-$\lambda_n$;
  a pump modulator configured to modulate the pump pulse having the wavelength $\lambda_1$ at a frequency $f_0$;
  a probe modulator configured to modulate the probe pulse $\lambda_1$ at a frequency $f_1$;
  time delay configuration for generating a time delay between the pump pulse and the probe pulses;
  an optical setup configured to: direct the $f_0$ modulated pump pulse on the target region of the sample to thereby produce an acoustic pulse propagating within the target region;
  direct the probe pulses to simultaneously impinge on the target region of the sample at the time delay relative to the pump pulse; and separate the light reflected from the sample, so that each of the $\lambda_1$-$\lambda_n$ wavelengths of the reflected probe pulses are detected as separate signals by a respective of the n detectors;
  a lock-in amplifier configured to demodulate the $\lambda_2$-$\lambda_n$ signals detected by the respective n detectors by locking in on $f_0$, enabling detection of the acoustic effect generated by the pump pulse, while removing background optical signal; and, for the $\lambda_1$ signal, to lock on frequencies $f_0 \pm f_1$ thereby allowing to electronically separate the pump pulse $\lambda_1$ from the probe pulse $\lambda_1$; and a processor configured to receive the demodulated signals and to determine a 3D nanostructure of the target region of the sample based thereon.

9. The system of claim 8, wherein the optical setup comprises:
  n−1 dichroic mirrors each of the n−1 dichroic mirrors having a cut-on wavelength $\lambda_m < \lambda_{cut-on} < \lambda_{m+1}$, wherein the $\lambda_m$ of each of the dichroic mirrors represents a different wavelength of the $\lambda_1$-$\lambda_n$ wavelengths; and
  n optical elements (BS) each optically coupled to a respective detector of the n detectors and to an associated dichroic mirror of the n−1 dichroic mirrors, wherein each of the n optical elements (BS) is configured to direct light reflected from the sample, through the respective dichroic mirror, to the respective detector.

10. The system of claim 8, wherein the optical setup comprises n−2 deflecting optical elements (M) optically associated with the n−1 dichroic mirrors, wherein each of the n−2 deflecting optical elements (M) is configured to receive light reflected from or transmitted through a dichroic mirror positioned optically before the deflecting optical element (M) and deflect it onto a dichroic mirror positioned optically after the deflecting optical element; and to receive light reflected from the dichroic mirror positioned optically after the deflecting optical element (M) and deflect it onto the dichroic mirror positioned optically before the deflecting optical element (M).

11. The system of claim 8, wherein the optical setup comprises a chromatic splitter configured to combine the $\lambda_1$-$\lambda_n$ wavelengths prior to reaching the sample and to separate the $\lambda_1$-$\lambda_n$ wavelengths reflected from the sample prior to reaching the n detectors.

12. The system of claim 11, wherein the optical setup further comprises n optical elements (BS) each optically coupled to a respective detector of the n detectors, wherein each of the n optical elements (BS) is configured to direct light reflected from the sample, through the chromatic splitter, to the respective detector.

13. The system of claim 12, wherein the optical setup further comprises n deflecting optical elements (M) optically associated with the n optical elements and with the diffraction grating or the prism, wherein each of the n deflecting optical elements is configured to receive light transmitted through the associated optical element (BS) and to deflect it onto the sample via the chromatic splitter; and to receive light reflected from the sample, via the chromatic splitter, and deflect it onto the respective detector of the n detectors.

14. The system of claim 8, wherein the time delay configuration is positioned the pump line optical path.

15. A method for in-depth profiling of a patterned wafer sample, the method comprising:
  providing a patterned wafer sample comprising a target region;
  projecting an optical pump pulse on the sample, such as to produce an acoustic pulse, which propagates within the target region of the sample,
  projecting a plurality of optical probe pulses on the sample, such that the probe pulse undergoes Brillouin scattering off the acoustic pulse within the target region; wherein each of the plurality of probe pulses has a different wavelength ($\lambda_1$-$\lambda_n$);
  passing each of the plurality of probe pulses through an optical setup configured to combine the plurality of probe pulses, such that they simultaneously reach the same target region of the sample and to separate the plurality of probe pulses upon their reflection from the sample, such that each of the plurality of probe pulses is detected by a separate detector; and analyzing the detected signals to obtain a 3D nanostructure of the target region of the sample.

16. The method of claim 15, wherein projecting the optical pump pulse further comprises modulating the pump pulse at a frequency $f_0$ using a modulator and generating a time delay between the pump pulse and the probe pulses using a time delay configuration, prior to passing on the pump pulse to the optical setup.

17. The method of claim 16, further comprising demodulating the signals detected by the detectors using a lock-in amplifier locked-in on $f_0$, enabling detection of the acoustic effect generated by the pump pulse, while removing background optical signal.

18. The method of claim 15, wherein the pump pulse has a wavelength $\lambda_0$.

19. The method of claim 15, wherein $\lambda_1$ is further used as the pump pulse by splitting the beam of probe source n=1, into a probe pulse $\lambda_1$ and pump pulse $\lambda_1$.

20. The method of claim 19, further comprising modulating the probe pulse $\lambda_1$ at a frequency $f_1$ and demodulating the $\lambda_1$ signal, using the lock-in amplifier, by locking on frequencies $f_0 \pm f_1$, thereby allowing to electronically separate the pump pulse $\lambda_1$ from the probe pulse $\lambda_1$.

* * * * *